(12) United States Patent
   Sommer (10) Patent No.: US 11,203,164 B2
(45) Date of Patent: Dec. 21, 2021

(54) INTEGRATED WELD STOP

(71) Applicant: Monoflo International, Inc., Winchester, VA (US)

(72) Inventor: Axel Sommer, Tacoma, WA (US)

(73) Assignee: MONOFLO INTERNATIONAL, INC., Winchester, VA (US)

( * ) Notice: Subject to any disclaimer, the term of this patent is extended or adjusted under 35 U.S.C. 154(b) by 274 days.

(21) Appl. No.: 15/427,547

(22) Filed: Feb. 8, 2017

(65) Prior Publication Data

US 2017/0232664 A1 Aug. 17, 2017

Related U.S. Application Data

(60) Provisional application No. 62/293,812, filed on Feb. 11, 2016.

(51) Int. Cl.
| | |
|---|---|
| *B29C 65/20* | (2006.01) |
| *B29C 65/00* | (2006.01) |
| *B65D 19/00* | (2006.01) |
| *B29C 65/78* | (2006.01) |
| *B29L 31/00* | (2006.01) |

(52) U.S. Cl.
CPC .......... *B29C 65/20* (2013.01); *B29C 65/7829* (2013.01); *B29C 66/1142* (2013.01); *B29C 66/348* (2013.01); *B29C 66/54* (2013.01); *B29C 66/7252* (2013.01); *B29C 66/73921* (2013.01); *B65D 19/00* (2013.01); *B29C 66/0042* (2013.01); *B29C 66/8122* (2013.01); *B29L 2031/7178* (2013.01)

(58) Field of Classification Search
CPC ............... B29C 65/7829; B29C 65/20; B29C 66/92611; B29C 65/7802; B29C 66/348; B65D 19/00
See application file for complete search history.

(56) References Cited

U.S. PATENT DOCUMENTS

| | | | | |
|---|---|---|---|---|
| 3,680,496 | A * | 8/1972 | Westlake, Jr. .......... | B29C 65/08 108/57.26 |
| 3,938,448 | A * | 2/1976 | Nishitani ................ | B29C 65/20 108/57.26 |
| 5,505,141 | A * | 4/1996 | Barber ............... | B65D 19/0038 108/56.1 |
| 6,006,677 | A * | 12/1999 | Apps .................. | B65D 19/0012 108/57.25 |
| 6,066,216 | A * | 5/2000 | Ruppel, Jr. ....... | B01L 3/502707 156/580.1 |
| 6,123,032 | A * | 9/2000 | Ohanesian ......... | B65D 19/0012 108/57.26 |
| 6,283,044 | B1 * | 9/2001 | Apps ...................... | B29C 66/54 108/57.25 |

(Continued)

*Primary Examiner* — Anthony Calandra
(74) *Attorney, Agent, or Firm* — Nixon & Vanderhye P.C.

(57) ABSTRACT

A weld stop element may be used in a hot plate welding process for bonding first and second plastic components. The weld stop element includes a weld stop post positioned between ribs of one or both of the components. The weld stop post is sized such that the weld stop post is not accessible by a heating element during a heating phase of the hot plate welding process. The weld stop post defines a stop position for when the first and second plastic components are pressed together after the heating phase.

7 Claims, 7 Drawing Sheets

(56) References Cited

U.S. PATENT DOCUMENTS

| | | | |
|---|---|---|---|
| 6,729,308 B1 * | 5/2004 | Kanamaru | B01D 29/111 |
| | | | 123/510 |
| 11,040,799 B1 * | 6/2021 | Sommer | B65D 19/0018 |
| 2002/0136856 A1 * | 9/2002 | Sugimura | B29C 66/1312 |
| | | | 428/60 |
| 2008/0254242 A1 * | 10/2008 | Asada | B29C 66/112 |
| | | | 428/34 |
| 2008/0261065 A1 * | 10/2008 | Fujimoto | B29C 65/1635 |
| | | | 428/543 |
| 2009/0000527 A1 * | 1/2009 | Ficker | B65D 19/0016 |
| | | | 108/57.25 |
| 2014/0158025 A1 * | 6/2014 | Apps | B29C 45/0003 |
| | | | 108/57.25 |

* cited by examiner

INTEGRATED WELD STOP

CROSS-REFERENCES TO RELATED APPLICATIONS

This application claims the benefit of U.S. Provisional Patent Application No. 62/293,812, filed Feb. 11, 2016, the entire content of which is herein incorporated by reference.

STATEMENT REGARDING FEDERALLY SPONSORED RESEARCH OR DEVELOPMENT (Not Applicable)

BACKGROUND

The invention relates to structure and methodology associated with welding plastic molded components and, more particularly, to an integrated weld stop that provides for accurate positioning of the component parts.

It is known to bond two separate plastic components using a hot plate welding process. To bond these separate components, the outermost facing surfaces (typically outermost edges of ribs) are heated to melt the plastic. The heating is conducted by contacting the components with a heat plate. The components remain in position, and only the top/bottom (outermost portion) of the ribs are heated to a melting point. Typically, the heat plate is Teflon coated for better release characteristics. The welding assembly generally includes mechanical stops to limit the travel of each component and to provide an even contact to the heat plate.

After the heat process is completed, the components are released from the heat plate, and the heat plate is removed. The components are subsequently pushed against each other at minimal pressure so that the melted plastic can bond. In a typical welding assembly, the weld tool or the welder utilizes mechanical stops to limit the travel of the parts. It is desirable for a high-quality weld that the stops are accurately positioned to prevent the parts from being pushed too hard together. Excessive pressure could cause insufficient welding, and parts can easily break. Additionally, the set up process for the existing weld assemblies is time-consuming and requires readjustment with changing molding conditions.

BRIEF SUMMARY

It would thus be desirable to eliminate the need for extraneous mechanical stops to facilitate the welding operation. According to the described embodiments, the plastic components may be provided with integrated stops that are positioned such that they do not contact the heating element during the heating phase of the welding process. The stops thus are not melted and maintain their position and height, creating a fixed internal stop for the welding phase that is more accurate than the welder and/or the extraneous tooling. The internal weld stops provide a constant stop position of the components and provide for accurately positioned components and a consistent welding process.

In an exemplary embodiment, a weld stop element may be used in a hot plate welding process for bonding a first plastic component having a plurality of first ribs with a second plastic component having a plurality of second ribs. The weld stop element includes a weld stop post positioned between at least one of the plurality of first and second ribs. The weld stop post is sized such that the weld stop post is not accessible by a heating element during a heating phase of the hot plate welding process. The weld stop post defines a stop position for when the first and second plastic components are pressed together after the heating phase.

The weld stop element may include at least two of the weld stop posts, one for each of the first and second plastic components. The weld stop element may include a plurality of weld stop posts for each of the first and second plastic components.

The first and second ribs may each have an outermost distal end, where a stop surface of the weld stop may be positioned short of the outermost distal end. In some embodiments the weld stop post is cylindrical although any shape may be suitable.

In another exemplary embodiment, each of two molded plastic components of an assembly include a plurality of ribs on a facing side, and at least one weld stop post positioned between adjacent ones of the plurality of ribs. The at least one weld stop post is positioned relative to the ribs such that a distal edge of the at least one weld stop post is short of outermost distal edges of the plurality of ribs. The facing sides of two plastic components are connected by welding.

Each of the two plastic components may include a plurality of weld stop posts respectively interposed between adjacent ones of the plurality of ribs. In this context, the weld stop posts on one of the two plastic components may correspond in number and may be aligned with the weld stop posts on the other of the two plastic components when the facing sides are aligned.

The at least one weld stop post on one of the two plastic components may be aligned with the at least one weld stop post on the other of the two plastic components when the facing sides are aligned.

In some embodiments, the at least one weld stop post is integral with each of the two plastic components.

The distance that the weld stop posts are short of the outermost distal edges of the plurality of ribs may correspond to an overlap distance for the plurality of ribs during welding.

In yet another exemplary embodiment, a method of coupling two molded plastic components includes the steps of (a) heating the facing sides of the two plastic components with a hot plate such that the outermost distal edges of the plurality of ribs begin to melt; (b) aligning the facing sides of the two plastic components; (c) pressing the two plastic components together such that the outermost distal edges of the ribs of one of the two plastic components is united with the outermost distal edges of the other of the two plastic components; and (d) limiting a relative displacement of the two plastic components in step (c) with the weld stop posts.

Step (d) may be practiced by engaging the distal edge of the at least one weld stop post of one of the two plastic components with the distal edge of the at least one weld stop post of the other of the two plastic components. Step (a) may be practiced without heating the weld stop posts.

BRIEF DESCRIPTION OF THE DRAWINGS

These and other aspects and advantages will be described in detail with reference to the accompanying drawings, in which.

DETAILED DESCRIPTION

Figure 1:
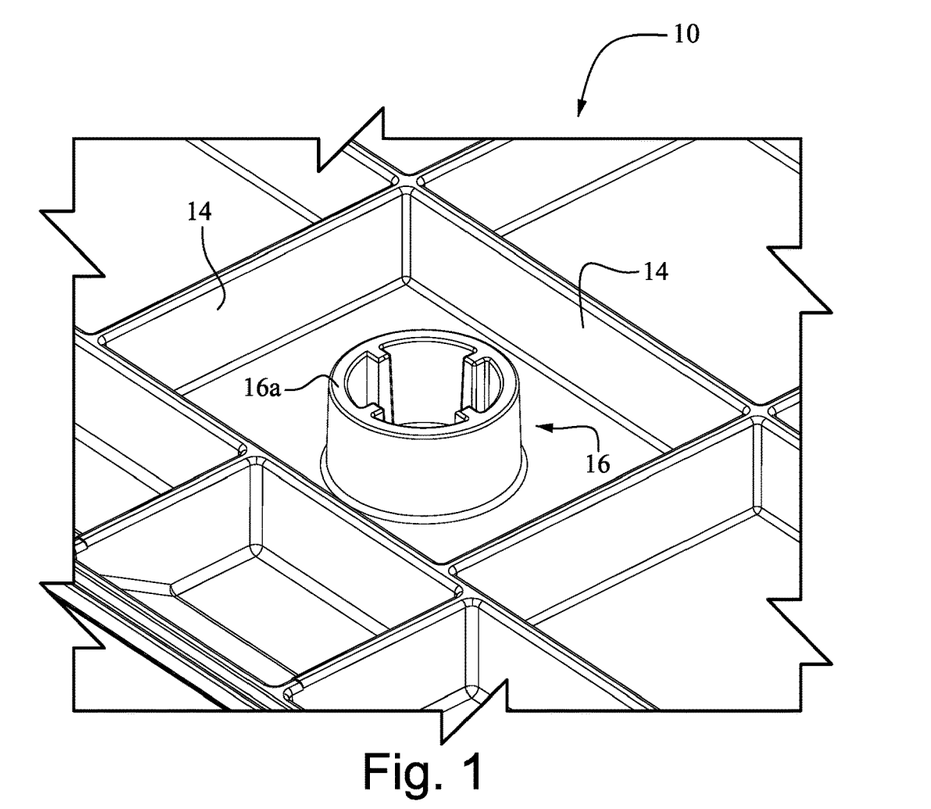
FIG. 1 is a perspective view of a weld-stop element including a weld stop post according to the described embodiments.
Figure 2:
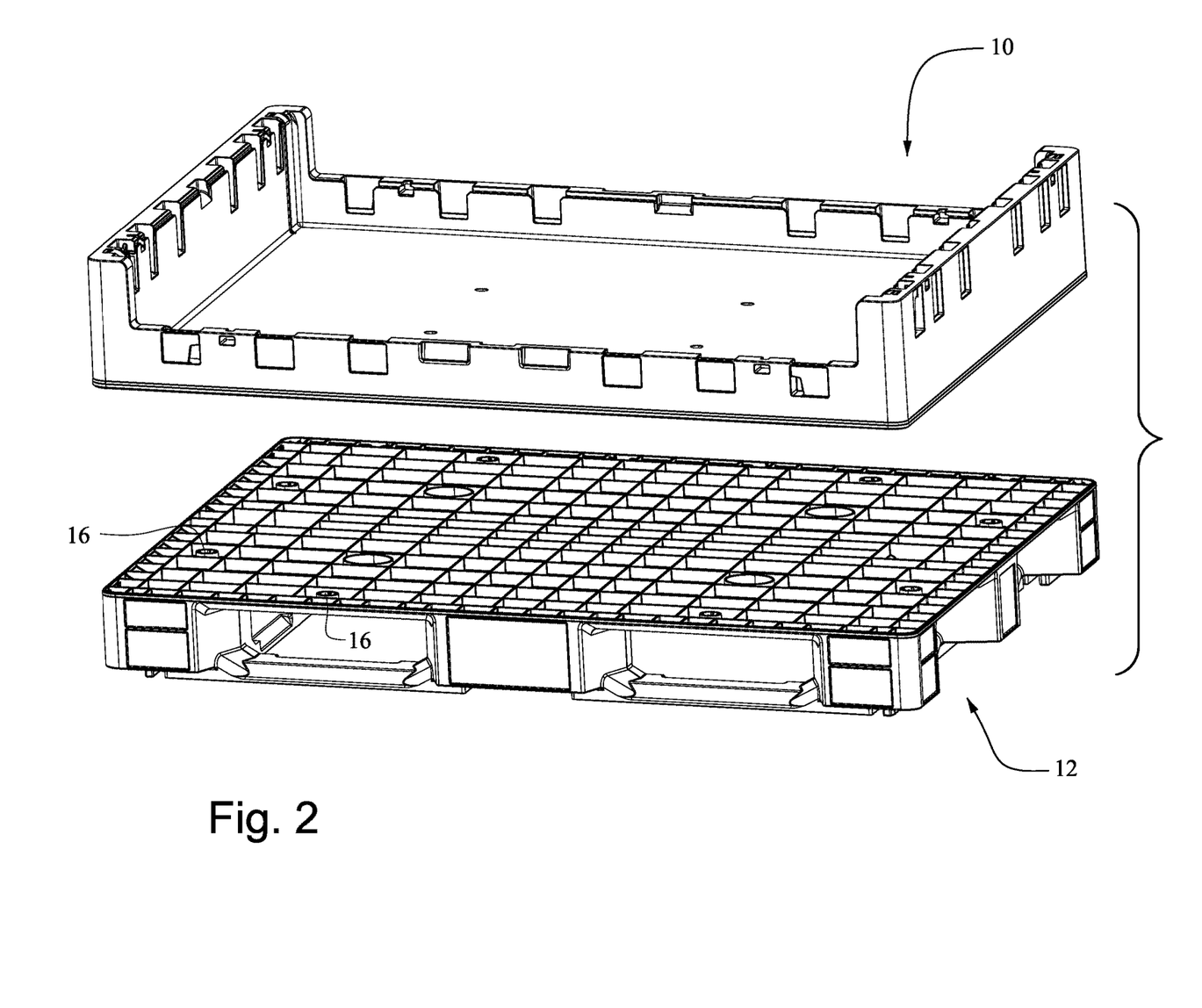
FIGS. 2 and 3 are perspective views of exemplary plastic components to be welded.
Figure 3:
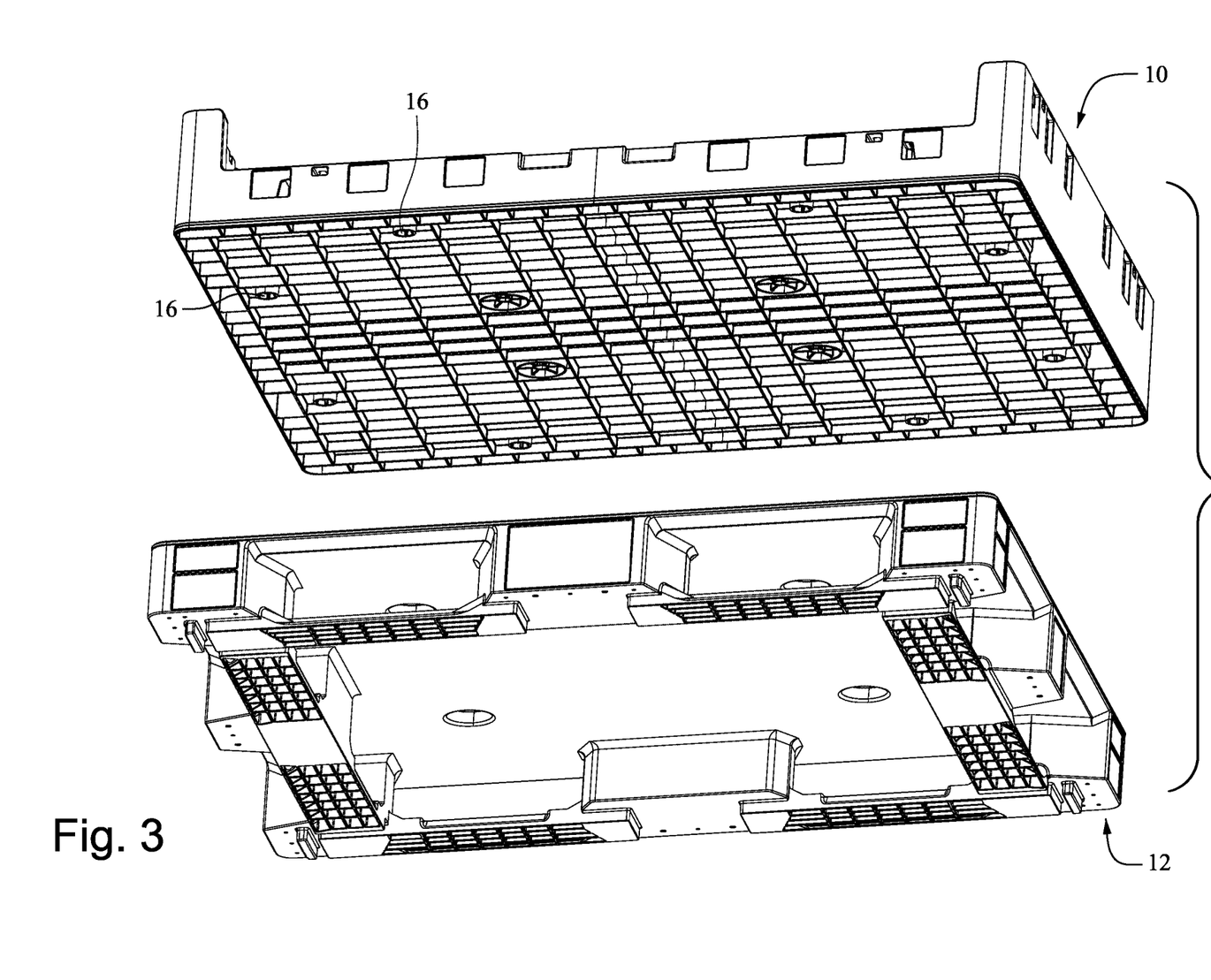

FIG. 1 is a perspective view of a weld stop element for use in a hot plate welding process for bonding a first plastic component 10 with a second plastic component 12. FIGS. 2 and 3 are perspective views showing an exemplary configuration of suitable first and second plastic components 10, 12. The pallet or tray in the exemplary configuration is formed by joining two pieces to into the finished product. It is desirable in some component designs to utilize separate pieces to facilitate the molding process.

Each of the first and second plastic components 10, 12 includes a plurality of ribs 14 that generally provide structural support for the resulting assembly. The weld stop element primarily includes a weld stop post 16 positioned between the ribs 14 of one or both of the first and second plastic components 10, 12. As shown in FIGS. 2 and 3, in some embodiments, each of the first and second plastic components 10, 12 includes a plurality of weld stop posts 16. If only one of the components includes the weld stop post(s) 16, the component could include an extended length post. Preferably, the weld stop posts 16 are integral with the first and/or second plastic components 10, 12.

Figure 1A:
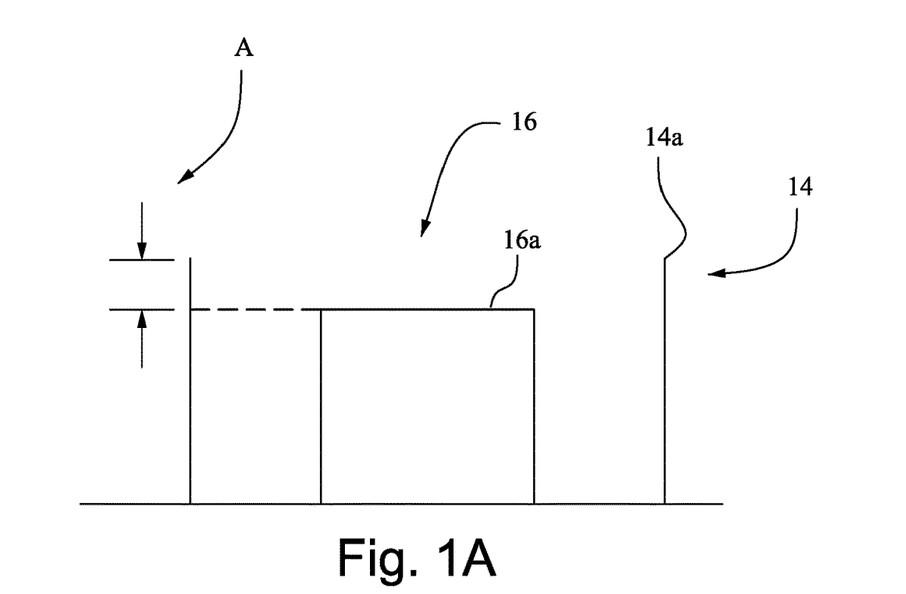
FIG. 1A shows the height/spatial relationship between the component ribs and the weld stop posts.

With reference to FIG. 1A, the weld stop posts 16 are sized and/or positioned relative to the ribs 14 such that the weld stop posts 16 are not accessible by a heating element during a heating phase of the hot plate welding process. That is, in some embodiments, the weld stop posts 16 are positioned relative to the ribs 14 such that a distal edge 16A of the weld stop posts 16 is short (i.e., below for an upward facing component, or above for a downward facing component) of the outermost distal edges 14A by the distance A shown in FIG. 1A. In some embodiments, the weld stop posts 16 are cylindrical as shown, although the weld stop posts 16 could have any shape.

Figure 4:
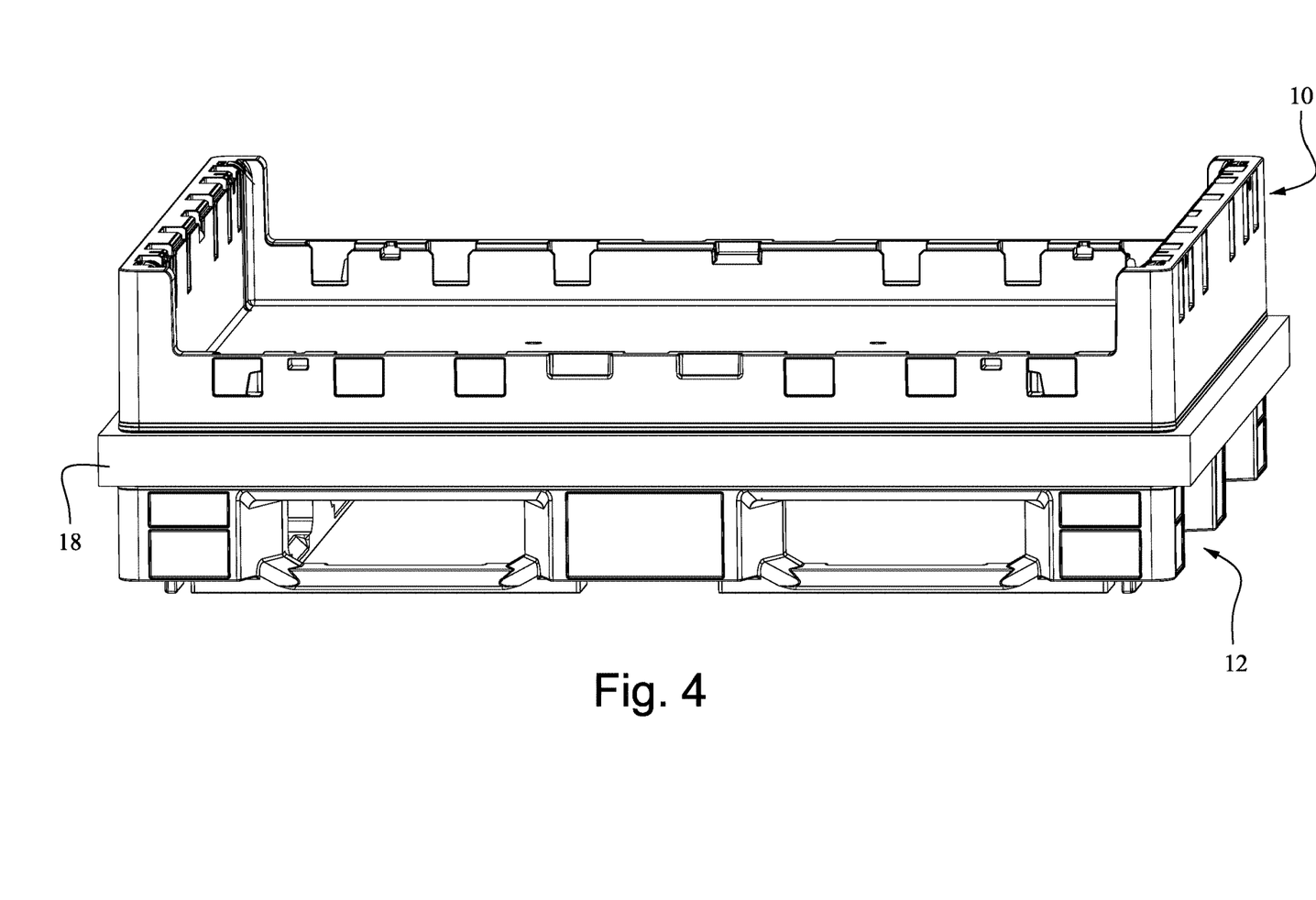
FIG. 4 shows the heating phase in welding the exemplary components.

FIG. 4 shows a heating phase of the hot plate welding process. In this phase, both parts 10, 12 are pressed against a hot plate 18 to melt the material at the outermost distal ends 14A of the ribs 14. This phase prepares the ribs 14 for the welding phase in which the parts are bonded. Typically, the hot plate 18 is PTFE-coated for easy release of the plastic component melted material. The hot plate 18 is removed from between the parts 10, 12 after the ribs 14 (or alternative outermost surfaces) have been heated to a melting point. With continued reference to FIG. 1A, by virtue of the distance A between the distal edge 16A of the weld stop posts 16 and the outermost distal edges 14A of the ribs 14, the weld stop posts 16 are not accessible by the heating element during the heating phase and thus are not melted during the heating phase. The weld stop posts 16 remain solid and rigid. The heating plate 18 may additionally (or alternatively) include recesses in the areas adjacent the weld stop posts 16 to further separate the heat generating by the heating plate 18 from the weld stop posts 16.

In an embodiment where only one of the plastic components 10, 12 includes the weld stop posts 16, the weld stop posts 16 on the one component could extend to the supporting (horizontal) surface of the other component. In this construction, the hot plate 18 may include a cut-out through which the weld stop posts 16 would extend to prevent the weld stop posts 16 from being heated during the heating phase.

Figure 5:
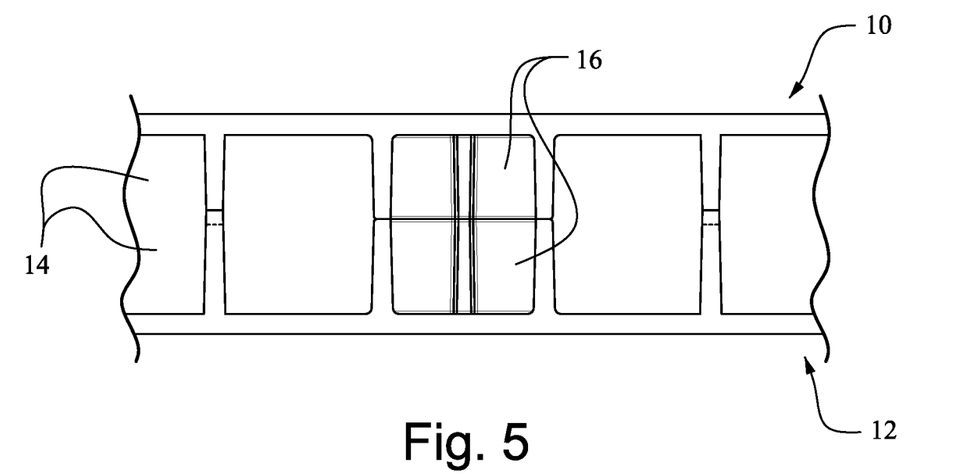
FIG. 5 shows the welding phase and the functionality of the weld stop posts during the welding phase.

FIG. 5 shows the welding phase for the first and second components 10, 12. In this phase, the facing sides of the plastic components 10, 12 are aligned and pressed together such that the outermost distal edges 14A of the ribs 14 of both of the plastic components 10, 12 are united. In this phase, the weld stop posts 16 of the facing sides are brought into contact under slight pressure. Since the weld stop posts 16 are solid, they limit further relative movement of the components 10, 12. The solid weld stop posts 16 act as spacers or stops to maintain the relative part height of the welded components. As shown in FIG. 5, the edges 14A of the facing ribs 14 are slightly overlapped when the distal edges 16A of the weld stop posts 16 come in contact. The weld stop posts 16 prevent the parts 10, 12 from being pushed too hard against each other, which could detrimentally affect the quality of the weld.

Figure 6:
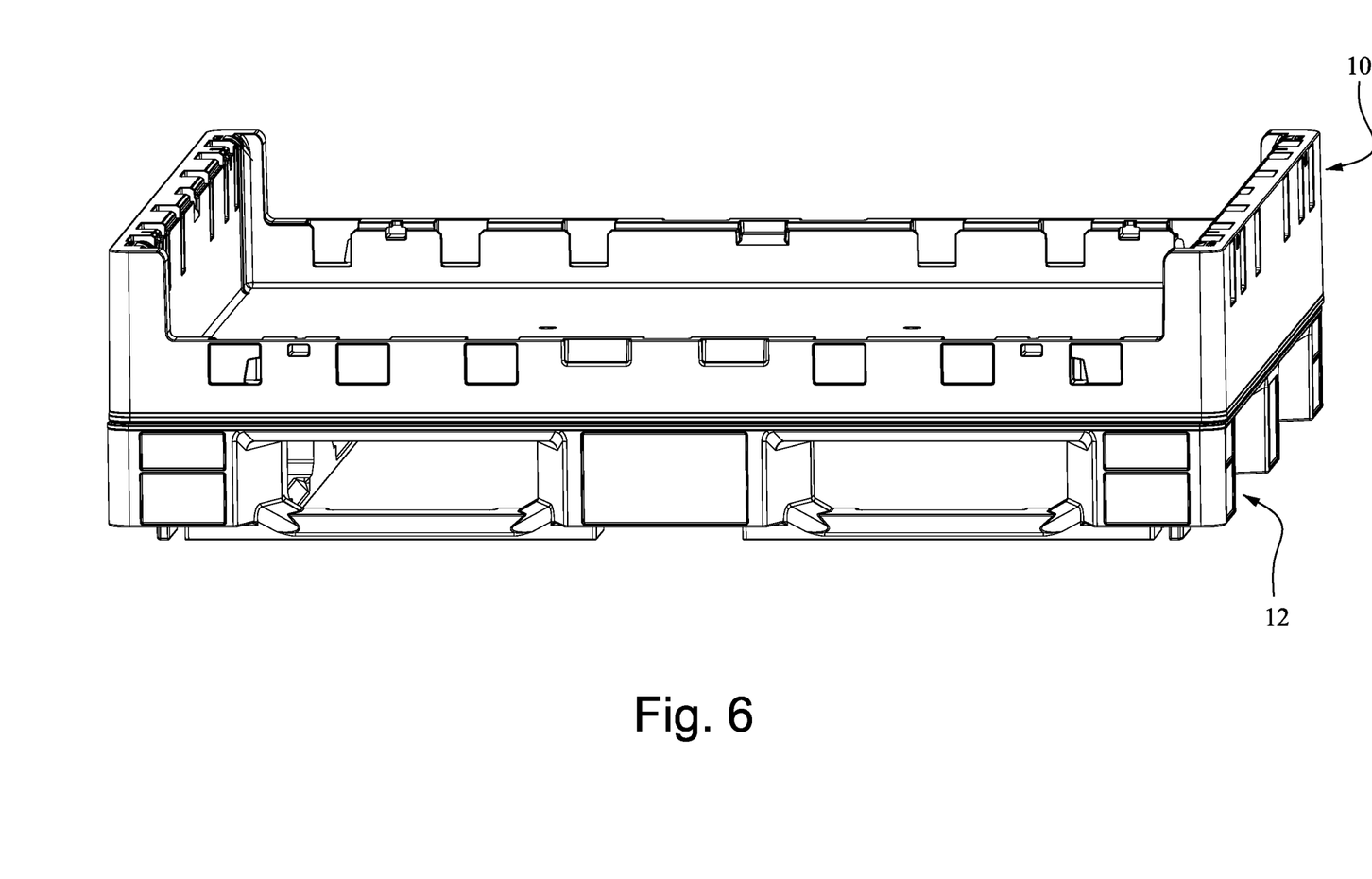
FIG. 6 is a perspective view showing the exemplary components bonded to form a single unit in the form of a material handling apparatus such as a pallet.
Figure 7:
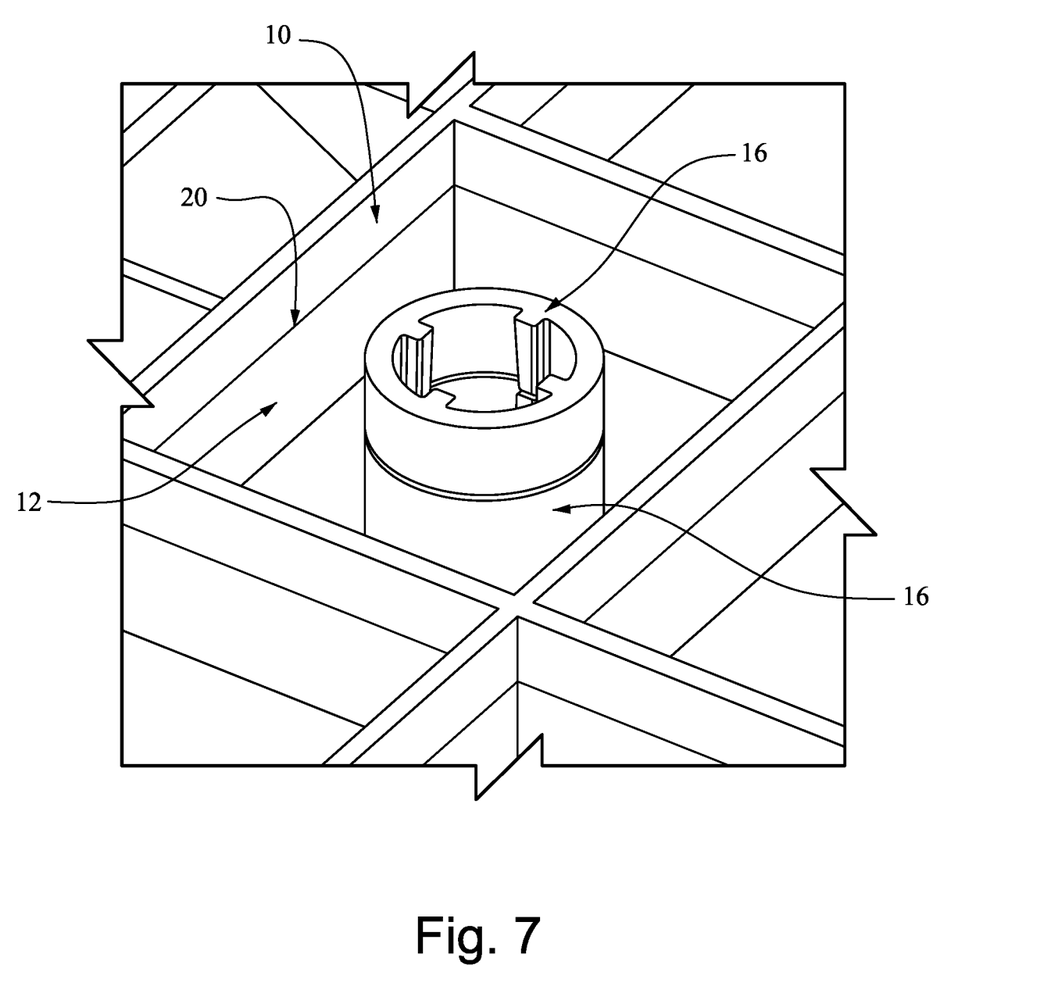
FIG. 7 is a sectional view through the top component after the welding phase.

FIG. 6 shows the finished product with the exemplary components 10, 12. After cooling, the parts 10, 12 are bonded and essentially form a single connected unit. FIG. 7 is a sectional view through the top of the assembly after the welding phase. A weld line 20 is shown for illustration purposes. In the final assembly, the first component 10 is welded to the second component 12 with the respective weld stop posts 16 in facing engagement.

The weld stop element according to the described embodiments ensures a consistent weld quality and improves the resulting part/product quality. Since the weld posts can be integrated into the plastic components, no adjustable weld stops in the weld tools are required. Set-up time and weld processing time can also be reduced.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An assembly of a material handling apparatus formed of two molded plastic components including an upper material handling section and a bottom section, respectively, the bottom section including a lower surface defining a bottommost surface of the assembly, and the bottom section including passages for fork tines of a fork lift, each of the two plastic components comprising:

a plurality of ribs on a facing side; and a plurality of weld stop posts respectively positioned between adjacent ones of the plurality of ribs, wherein the passages in the bottom section are positioned on a side of the bottom section opposite from the facing side, wherein the weld stop posts are respectively positioned relative to the ribs such that prior to connecting the facing sides of the two plastic components by welding, a distal edge of each of the weld stop posts is short of outermost distal edges of the plurality of ribs and is thereby not accessible by a heating element during a heating phase, wherein the weld stop posts on one of the two plastic components correspond in number to the weld stop posts on the other of the two plastic components, and wherein each of the weld stop posts on the one of the two plastic components is in direct facing alignment with and is in contact with a corresponding one of the weld stop posts on the other of the two plastic components when the facing sides are aligned and connected, and wherein each of the two plastic components has been molded as a one-piece component.

2. An assembly according to claim 1, wherein the weld stop posts are cylindrical.

3. An assembly according to claim 1, wherein the weld stop posts are integral with each of the two plastic components, respectively.

4. An assembly according to claim 1, wherein a distance that the weld stop posts are short of the outermost distal edges of the plurality of ribs corresponds to an overlap distance for the plurality of ribs during welding.

5. An assembly for a material handling apparatus incorporating a weld stop element for use in a hot plate welding process, the assembly comprising:
   a first plastic component having a plurality of first ribs, the first plastic component including an upper surface defining a material handling section;
   a second plastic component having a plurality of second ribs, the first plastic component being bonded to the second plastic component via the hot plate welding process with the upper surface facing outward, the second plastic component including a lower surface defining a bottommost surface of the assembly; and
   the weld stop element comprising a first plurality of weld stop posts respectively positioned between the plurality of first ribs and a second plurality of weld stop posts respectively positioned between the plurality of second ribs, wherein the first and second pluralities of weld stop posts are sized such that the weld stop posts are not accessible by a heating element during a heating phase of the hot plate welding process, the first and second weld stop posts respectively being in direct facing alignment and in contact with each other to define a stop position for when the first and second plastic components are aligned and pressed together after the heating phase,
   wherein each of the first and second plastic components has been molded as a one-piece component.

6. An assembly according to claim 5, wherein the pluralities of first and second ribs each have an outermost distal end, and wherein stop surfaces of the first and second weld stops are positioned short of the respective outermost distal ends.

7. An assembly according to claim 5, wherein the first and second weld stop posts are cylindrical.

* * * * *